No. 691,141. Patented Jan. 14, 1902.
D. J. HOFFMAN & J. W. HELM.
DITCHING MACHINE.
(Application filed Aug. 12, 1901.)
(No Model.)
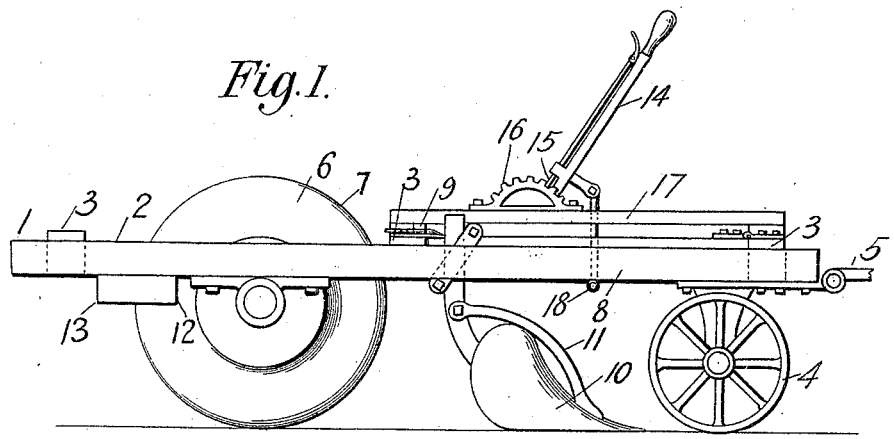
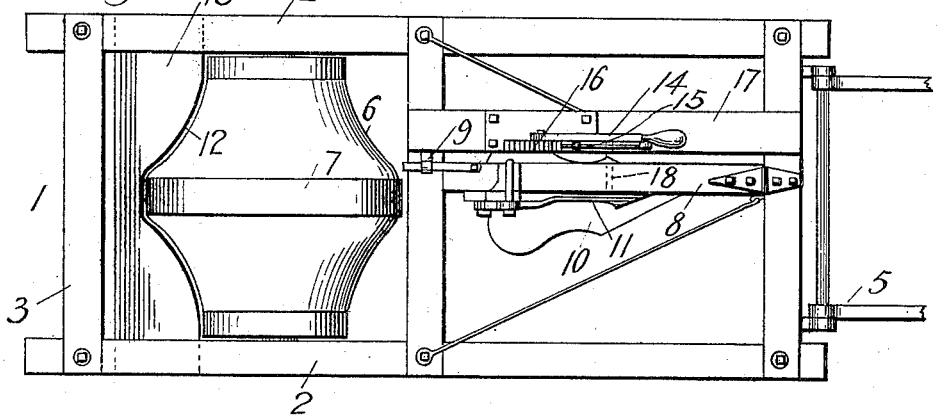
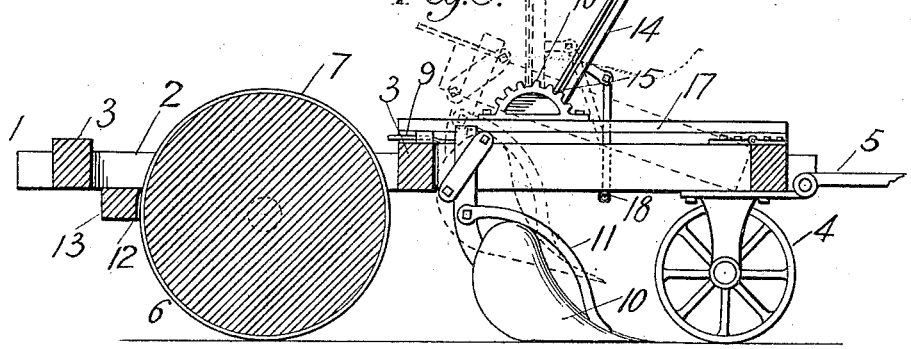
Inventors
D. J. Hoffman and
J. W. Helm

UNITED STATES PATENT OFFICE.

DAVID J. HOFFMAN AND JOHN W. HELM, OF PARACHUTE, COLORADO.

DITCHING-MACHINE.

SPECIFICATION forming part of Letters Patent No. 691,141, dated January 14, 1902.

Application filed August 12, 1901. Serial No. 71,699. (No model.)

*To all whom it may concern:*

Be it known that we, DAVID J. HOFFMAN and JOHN W. HELM, citizens of the United States, residing at Parachute, in the county of Garfield and State of Colorado, have invented certain new and useful Improvements in Ditching-Machines; and we do declare the following to be a full, clear, and exact description of the invention, such as will enable others skilled in the art to which it appertains to make and use the same.

The invention relates to ditching-machines, and more particularly to machines for forming irrigating-ditches.

The object of the invention is to provide a machine of this character which shall be simple of construction, durable in use, comparatively inexpensive of production, and one which will make a smooth even ditch and pack the soil at the wall of the ditch to prevent it from loosening and falling down into the ditch and offering an obstruction to the water.

With this and other objects in view the invention consists of certain novel features of construction, combination, and arrangement of parts, which will be hereinafter more fully described, and particularly pointed out in the appended claim.

In the accompanying drawings, Figure 1 is a side elevation of our improved ditching-machine. Fig. 2 is a top plan view, and Fig. 3 is a longitudinal sectional view.

Referring to the drawings, 1 denotes the frame, which preferably consists of the side pieces 2, connected together by cross-pieces 3. The forward end of the frame is supported by caster-wheels 4 and has attached to it a draft appliance 5, while the rear of the frame is supported by a roller 6, having intermediate its ends an annular swell 7, for a purpose hereinafter to appear.

8 denotes the plow-beam, hinged to the front cross-bar and releasably connected to the intermediate cross-bar by a suitable fastening consisting, preferably, of a keeper 9 and a pivoted latch secured to the beam. Secured to and projecting downwardly from the beam is a ditching-plow 10, which may be of any well-known or approved construction and is provided with a fixed colter 11.

As the machine is drawn along, the plow will make the ditch, and the walls of this ditch will be made smooth or pressed tightly by the annular bulge of the roller which follows in the line of the plow. To prevent dirt adhering to the roller, a cleaner 12, consisting of a bar 13, is arranged immediately at the rear of the roller in such relation to its periphery as to scrape off any soil which may adhere thereto.

When it is desired to move the machine from one place to another, the plow-beam is unfastened from the intermediate cross-bar and is elevated by a hand-lever 14, which is provided with a pawl 15, working on a segmental rack 16, secured to a bar 17. The lower end of the lever is provided with a laterally-projecting arm 18, which projects under the plow-beam and holds the same elevated, so that the machine may be drawn along roads and through fields without the plow entering the soil.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

In a ditching-machine, the combination with the main frame, of wheels supporting the forward end thereof, a roller supporting the rear end thereof and formed with an annular bulge, a plow-beam hinged at one end to the main frame and provided with a standard, means for releasably connecting it at its other end to the main frame, a plow carried by the said standard in line with the annular bulge of the roller, and means for holding the plow in elevated position free from contact with the ground, substantially as set forth.

In testimony whereof we have hereunto set our hands in presence of two subscribing witnesses.

D. J. HOFFMAN.
J. W. HELM.

Witnesses:
FRED BARTHELL,
R. BARTHELL.